United States Patent [19]

Hinn

[11] Patent Number: 4,612,576
[45] Date of Patent: Sep. 16, 1986

[54] AUTOMATIC KINESCOPE BIAS SYSTEM WITH AC COUPLED VIDEO OUTPUT STAGE

[75] Inventor: Werner Hinn, Zollikerberg, Switzerland

[73] Assignee: RCA Corporation, Princeton, N.J.

[21] Appl. No.: 656,369

[22] Filed: Oct. 1, 1984

[30] Foreign Application Priority Data

Aug. 13, 1984 [GB] United Kingdom ............... 8420537

[51] Int. Cl.[4] ........................................... H04N 5/16
[52] U.S. Cl. ................................. 358/171; 358/242; 358/34; 358/64
[58] Field of Search ................. 358/242, 171, 243, 74, 358/64, 65, 34

[56] References Cited

U.S. PATENT DOCUMENTS

| 3,647,944 | 3/1972 | Anderson | 358/34 |
| 4,082,996 | 4/1978 | Hinn | 358/65 |
| 4,263,622 | 4/1981 | Hinn | 358/242 |
| 4,285,008 | 8/1981 | Osawa et al. | 358/65 |
| 4,387,405 | 6/1983 | Hinn | 358/243 |
| 4,549,214 | 10/1985 | Hinn | 358/171 |

FOREIGN PATENT DOCUMENTS 1015649 1/1966 United Kingdom .
2042308 9/1980 United Kingdom .
2149610 6/1985 United Kingdom .

OTHER PUBLICATIONS

Copending U.S. patent application Ser. No. 549,478 of W. Hinn filed 11/7/83, titled "Video Signal DC Restoration Circuit".
Copending U.S. patent application Ser. No. 532,333 of R. L. Rodgers, III, filed 5/31/83, titled "Brightness Control Network in a Video Signal Processor with AC Coupled Output Stages".

Primary Examiner—James J. Groody
Assistant Examiner—E. Anne Toth
Attorney, Agent, or Firm—P. J. Rasmussen; P. M. Emanuel; R. H. Kurdyla

[57] ABSTRACT

A video processing and display system includes an image displaying kinescope, an AC coupled kinescope driver stage, and a system for automatically controlling the kinescope bias. During image blanking intervals the kinescope grid electrode is excited to induce a cathode output pulse related to the magnitude of the kinescope black current level. A DC restoration circuit responds to the induced pulse and provides to the kinescope a bias control signal related to the magnitude of the induced pulse, for maintaining a desired kinescope black current bias.

10 Claims, 3 Drawing Figures

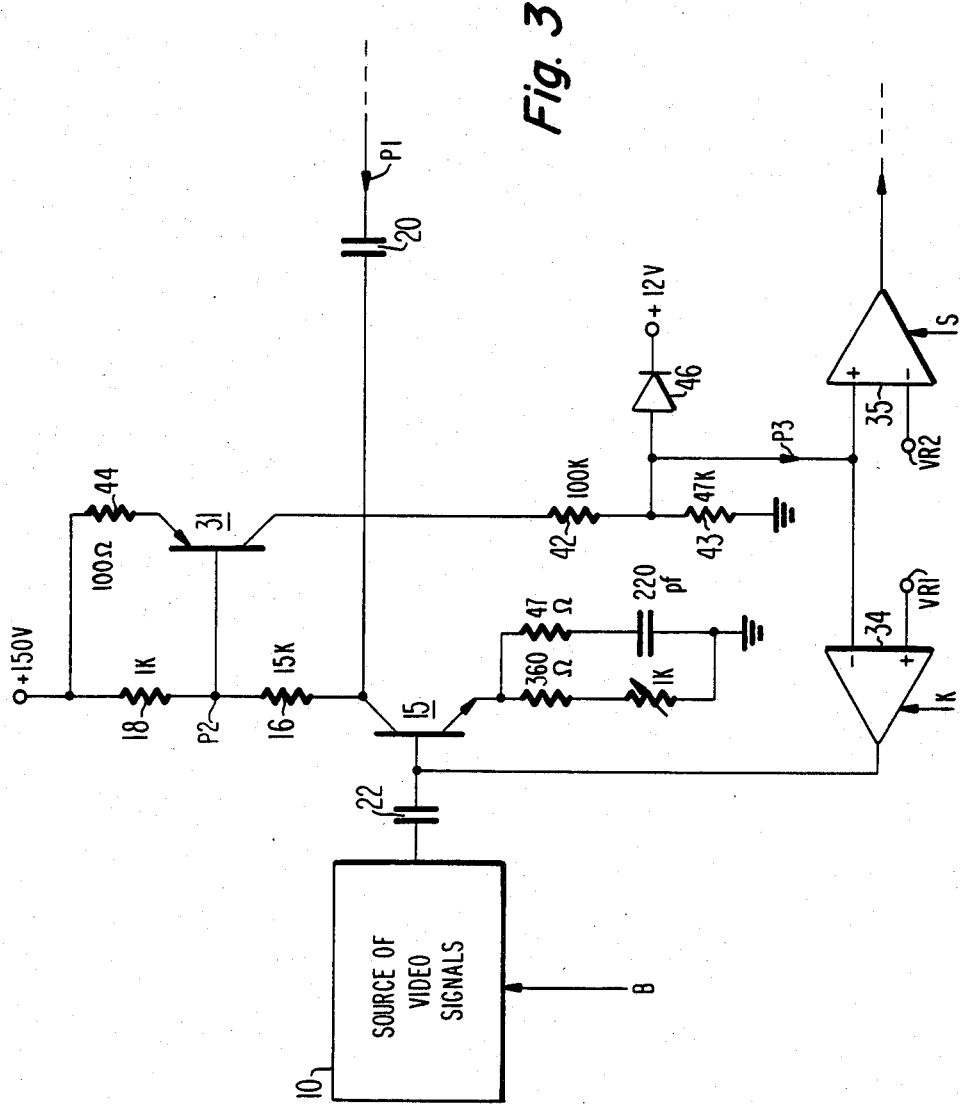

AUTOMATIC KINESCOPE BIAS SYSTEM WITH AC COUPLED VIDEO OUTPUT STAGE

This invention concerns apparatus for automatically controlling the bias of an image display device such as a kinescope in a video processing and display system including an AC coupled video output stage.

Video signal processing and display systems such as television receivers and video monitors sometimes employ an automatic kinescope bias (AKB) control system for automatically maintaining proper black current levels for each electron gun of an associated image displaying kinescope. As a result of this operation, displayed picture colors and gray scale tracking of the kinescope are prevented from being adversely affected by variations of kinescope bias from a desired level due to aging and temperature effects, among other factors. Various types of AKB systems are known, such as are described in my U.S. Pat. Nos. 4,263,622 and 4,387,405 for example.

An AKB system typically operates during image blanking intervals when the kinescope conducts a small black level representative current. This current is sensed by the AKB system to generate a control signal representing the difference between the sensed black current level and a desired black current level, and the control signal is applied to video signal processing circuits with a sense for reducing the difference. In previous AKB systems the kinescope bias is adjusted to the proper level by applying the control signal to the video output kinescope driver stage for varying the output bias of the driver stage, and thereby varying the bias of the signal input electrode (e.g., the cathode electrode) of the kinescope such that proper kinescope bias is maintained. Such systems require that the kinescope be DC coupled rather than AC coupled (capacitively coupled) to the output of the driver stage. Howver, AC coupling of the driver stage to the kinescope is often desirable, such as in wideband video monitor systems where it is desirable to maintain a substantially fixed DC output bias for the driver stage.

AC coupling the driver to the kinescope advantageously permits the working point of the driver stage to be optimized, and allows the use of a lower operating supply voltage for reduced power consumption. The use of a lower operating supply voltage permits the use of a lower value load resistance for the driver stage, which is desirable in wideband video applications. A lower supply voltage also allows the use of inexpensive output transistors without a heatsink, which is particularly advantageous in consumer television receivers.

Accordingly, there is disclosed herein an AKB system which is advantageously capable of being used in a video processing system wherein video output signals from a video driver amplifier are AC coupled to an intensity control assembly of an image display device. During periodic automatic bias control intervals a signal representative of the black current conducted by the intensity control assembly is caused to be developed. A DC restoration circuit, with an output coupled to the intensity control assembly, responds to the black current representative signal to provide an output biasing signal with a magnitude related to the amplitude of the black current representative signal. The biasing signal serves to maintain a desired black current level of the intensity control assembly.

In an implementation of the invention, the intensity control assembly is excited during image blanking intervals to induce an output pulse with a magnitude related to the magnitude of black current conducted by the assembly. In response to the induced pulse, the DC restoration circuit provides the biasing signal to a capacitor which serves to AC couple the video output signals from the video driver amplifier to the intensity control assembly.

In the drawing:

FIG. 3 depicts an alternate form of the arrangement of FIG. 1.

Figure 1:
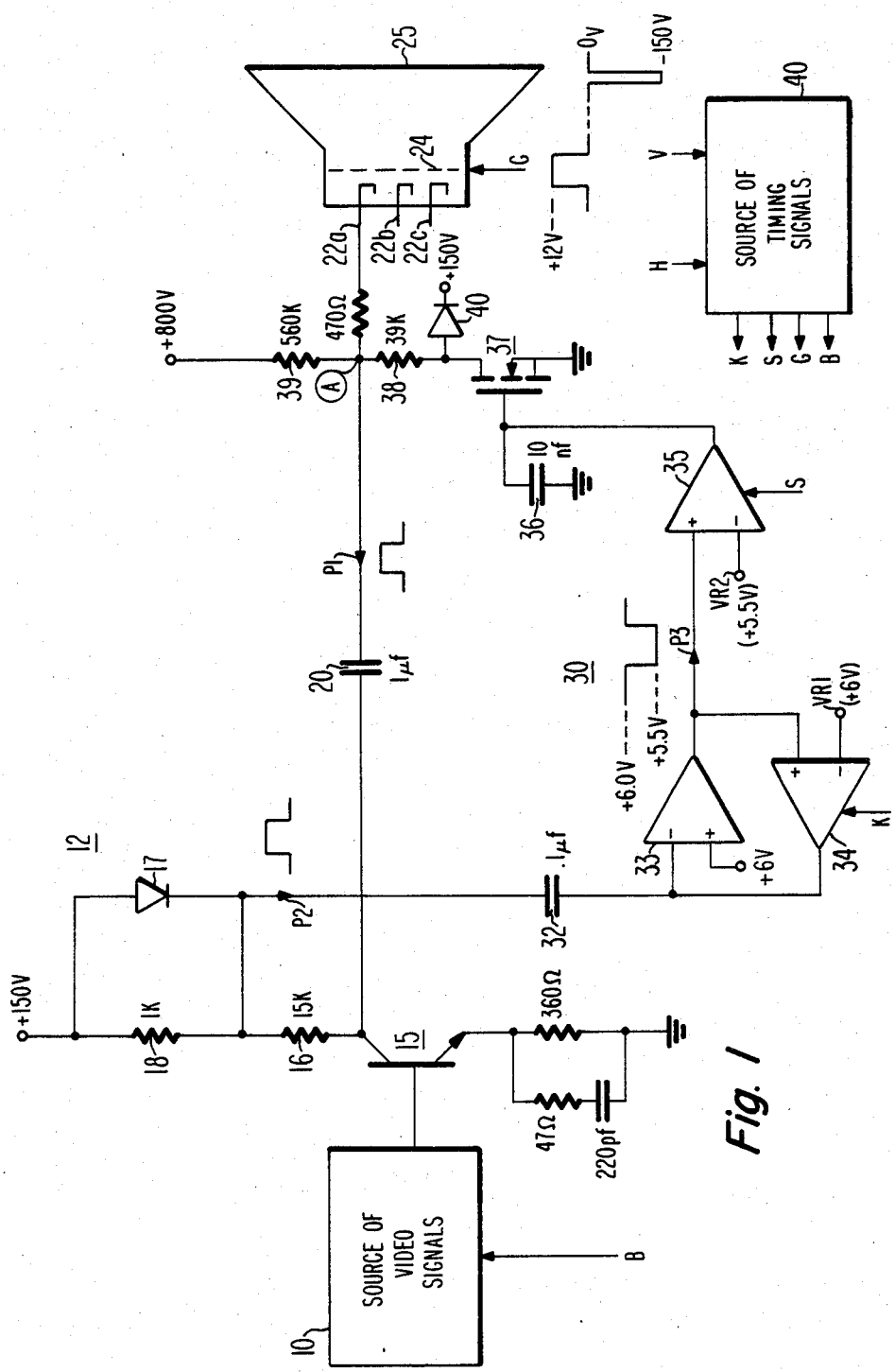
FIG. 1 shows a portion of a television receiver including an AC coupled video output driver stage, and an AKB system in accordance with the present invention.

In FIG. 1, a video signal such as of the red color signal component of a color video signal from a source 10 is amplified by a video output driver amplifier stage 12. Amplifier 12 includes a high voltage transistor 15 with a collector output circuit including series connected load resistors 16 and 18 with different values coupled to a source of operating supply voltage (+150 volts) for transistor 15. A normally non-conductive diode 17 limits excessively large video output signal amplitude excursions during normal image intervals. An amplified video signal developed at the collector output of transistor 15 exhibits a magnitude sufficient to drive an intensity control cathode electrode 22a of a color kinescope 25, and is AC coupled to cathode 22a via a capacitor 20. In this illustration kinescope 25 is of the self-converging "in-line" gun type with a commonly energized grid 24 associated with each of separate cathode electrodes 22a, 22b and 22c. The separate cathode electrodes each form an electron gun assembly of kinescope 25 together with grid 24.

An automatic kinescope bias (AKB) control network 30 operates as a DC restoration network to maintain a desired level of black current conduction for the kinescope electron gun assembly comprising cathode 22a. Similar AKB networks (not shown) are respectively associated with the electron guns comprising cathodes 22b and 22c which receive, e.g., the green and blue color signal components from source 10 in a manner similar to that illustrated for the red signal component. The operation of AKB network 30 will be described with regard to the AKB timing signal waveforms shown in FIG. 2. The timing signal are generated by a source 40 in response to a horizontal image synchronizing signal H and a vertical image synchronizing signal V, both derived from deflection circuits of the receiver.

Figure 2:
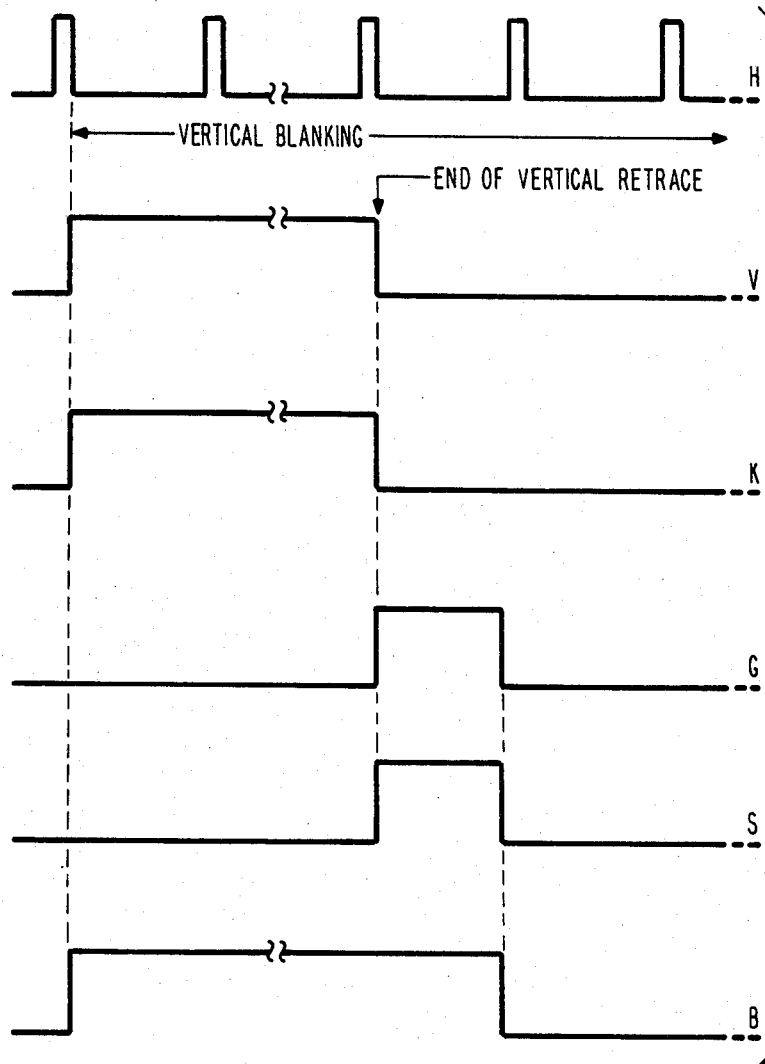
FIG. 2 illustrates timing signal waveforms helpful in understanding the operation of the system shown in FIG. 1.

Referring to FIG. 2 for the moment, the AKB operating interval includes a sensing interval which occurs shortly after the end of each video signal vertical retrace interval within the vertical blanking interval, during which time video signal image information is absent. During this time a positive grid drive pulse G and a positive sensing enable pulse S are generated as shown, each having a duration of approximately one horizontal image line interval in this example. Also associated with the AKB operation is a clamping interval when a clamp keying pulse K is developed, prior to pulses G and S. A blanking pulse B encompasses the AKB operating interval when pulses K, G and S are developed, and serves to establish a video signal reference condition during the AKB operating intervals.

Continuing with FIG. 1, blanking signal B is applied to a blanking input terminal of signal source 10 to inhibit the video signal output of source 10 during AKB operating intervals. During each AKB black current sensing interval, positive grid drive pulse G forward biases grid 24 of the kinescope, thereby causing the electron gun assembly comprising cathode 22a and grid 24 to increase conduction. In response to pulse G a similarly phased, positive current pulse is induced at cathode 22a during the grid pulse interval. The amplitude of the cathode output current pulse is related to the level of cathode black current conduction (typically a few microamperes).

The induced cathode output pulse is coupled as a current pulse P1 of approximately 1 microampere via AC coupling capacitor 20 to the collector output circuit of transistor 15. Current pulse P1 causes a positive voltage pulse P2 with a peak-to-peak amplitude of approximately 1 millivolt to be developed across sensing resistor 18. Pulse P2 is AC coupled via a capacitor 32 to an inverting operational amplifier 33 with a voltage gain of approximately 500, so that an amplified, inverted version of pulse P2, shown as a voltage pulse P3, appears at the output of amplifier 33. Pulse P3 exhibits a peak-to-peak amplitude of approximately 0.5 volts with respect to a positive peak pedestal reference level of +6.0 volts which is stabilized by means of a feedback clamping circuit.

The feedback clamping circuit includes an operational transconductance amplifier 34 and capacitor 32. Amplifier 34 has an inverting input (−) coupled to a source of positive reference voltage VR1 (+6.0 volts), a non-inverting input (+) which is coupled to the output of amplifier 33, and an output coupled to capacitor 32 at the inverting input of amplifier 33. Clamping amplifier 34 is keyed to conduct the response to keying signal K, which immediately precedes the AKB sensing interval encompassed by pulse S, as shown in FIG. 2. By feedback action amplifier 34 modifies the charge on coupling capacitor 32 so as to maintain the positive peak pedestal reference level of signal P3 clamped to 6.0 volts.

Clamped signal P3 is applied to a non-inverting input (+) of an operational transconductance amplifier 35 which acts as a keyed comparator. A positive reference voltage VR2 of +5.5 volts in this example is applied to an inverting input (−) of amplifier 35. Amplifier 35 is keyed to conduct by sense enable pulse S for sensing and comparing the peak amplitude of black current representative input signal P3 with input reference voltage VR2. If the negative-going peak amplitude of signal P3 substantially equals reference voltage VR2, the output current of amplifier 35 does not change. This corresponds to a condition of correct kinescope cathode bias wherein the existing bias of the kinescope is not altered by the AKB system.

As discussed below, network 30 operates to restore the DC level at cathode 22a via terminal A, thereby establishing the DC bias of cathode 22a, as a function of the magnitude of signal P3.

The peak negative-going amplitude of signal P3 differs from reference voltage VR2 in accordance with the amount by which kinescope cathode bias is incorrect. Illustratively, if the amplitude of signal P3 is such that the output current of amplifier 35 is caused to increase, a related increase in charge is developed on a storage capacitor 36. The increased charge on capacitor 36 causes the conduction of a transistor 37 to increase whereby the current conducted through resistors 38 and 39 increases. Such increased current conduction causes the DC bias voltage at a node A in the cathode signal path to decrease accordingly until the correct bias condition is reached as sensed by amplifier 35. Thus the closed loop control action of the AKB feedback path including capacitor 20, resistors 16 and 18, capacitor 32, amplifiers 33 and 35, transistor 37 and resistors 38 and 39 stabilizes the peak amplitude of signal P3 at a level of VR1−VR2, corresponding to the correct black level kinescope bias condition. In this example a correct bias condition corresponds to current pulse P1 with a peak amplitude of approximately 1 microampere, voltage pulse P2 with a peak amplitude of approximately 1 millivolt, and voltage pulse P3 with a peak amplitude of approximately +0.5 volts. By feedback action network 30 will maintain such amplitude levels by modifying the voltage at node A to compensate for a sensed incorrect bias condition. Negligible loading by DC restoration network 30 at video signal node A can be achieved by choosing resistors 38 and 39 with low parasitic capacitance, such as metal film resistors.

Normal blacker-than-black blanking to suppress the kinescope beam spot during periodic horizontal and vertical image retrace intervals is accomplished by means of a negative going −150 volt pulse applied to kinescope grid 24, rather than by blanking the video signal prior to the kinescope driver amplifier. This method of blacker-than-black retrace blanking eliminates the need for the kinescope driver to accommodate the operating point shifts otherwise associated with blacker-than-black retrace blanking.

The manner in which black current representative signal P2 is sensed via relatively low value series sampling resistor 18 in the collector output circuit of driver transistor 15 results in significantly reduced capacitive loading of the kinescope driver stage. This aspect of the disclosed AKB system is particularly advantageous in a wideband system such as a video monitor, and is described in greater detail in my concurrently filed U.S. patent application Ser. No. 656,470, now U.S. Pat. No. 4,600,950, titled "Kinescope Bias Sensing Circuit." Briefly, in order for a capacitive load to be detrimental to the frequency response of the kinescope driver, it must be effective at the output of the driver (e.g., at the collector output of transistor 15), or anywhere along the signal path between the driver output and the kinescope input. The input capacitance of AKB network 30 has substantially no effect upon the high frequency response of the driver stage because of the isolation produced by relatively large load resistor 16 compared to smaller sensing resistor 18, which desirably presents a much lower impedance to the input capacitance of AKB network 30.

FIG. 3 shows an alternate form of a portion of the AKB system of FIG. 1, wherein corresponding elements are identified by the same reference number, and the leads identified by dashed lines connect to the same places as corresponding leads in FIG. 1. The arrangement of FIG. 3 differs from that of FIG. 1 with respect to the manner in which clamping is accomplished, and with respect to the manner in which signal P2 is amplified to produce signal P3.

In FIG. 3, both black current representative signals P2 and P3 are clamped by means of a keyed feedback clamping circuit including keyed amplifier 34 together with a video signal input capacitor 22 which AC couples video signals to the base input of driver transistor 15. The signal gain imparted to signal P2 to produce signal P3 is provided by means of a circuit including a PNP amplifier transistor with collector output resistors 42 and 43 and an emitter resistor 44. The desired signal gain of approximately 500 is determined by the ratio of the value of resistor 43 to that of resistor 44. Resistor 42 serves to reduce the power dissipation in transistor 31 by reducing its collector-to-emitter voltage, thereby permitting use of a small, inexpensive plastic type transistor for transistor 31.

In both of the FIG. 1 and FIG. 2 arrangements, manual pre-adjustment of picture gray scale balance can be achieved by varying reference voltage VR2 while maintaining reference voltage VR1 constant. This would permit black level pre-adjustment over a small range, such as may be required in certain applications such as precision video monitors. Also, to increase the high frequency response of driver 12, the values of the collector and emitter resistances of transistor 15 can be reduced, and a cascode amplifier arrangement could be substituted for transistor 15.

What is claimed is:

1. In a video signal processing system including an image display device for displaying video information in response to a video signal applied to an intensity control assembly thereof including an intensity control electrode, apparatus comprising:
    a driver amplifier stage;
    means for AC coupling video signals from an output of said driver amplifier;
    a current path for coupling video signals from said AC coupling means to said intensity control assembly; and
    bias control means coupled to said display device for automatically maintaining a desired bias condition for said display device, wherein said bias control means comprises
    means for generating a signal with a magnitude representative of the magnitude of the black current conducted by said display device during image blanking intervals;
    DC restoration means responsive to said representative signal for providing an output biasing signal related to the magnitude of said representative signal; and
    means for coupling said biasing signal to said intensity control assembly to maintain said desired bias condition.

2. Apparatus according to claim 1, wherein
    said current path couples video signals to said intensity control electrode; and
    said biasing signal is coupled to said intensity control electrode via said current path.

3. Apparatus according to claim 2, wherein
    said image display device comprises a kinescope and said intensity control assembly comprises a cathode intensity control electrode and an associated grid electrode; and
    said generating means comprises means for forward biasing said intensity control assembly during image blanking intervals to produce a cathode output signal corresponding to said black current representative signal.

4. Apparatus according to claim 3, wherein
    said generating means provides a forward biasing excitation signal to said grid electrode to produce said cathode output signal.

5. Apparatus according to claim 1, wherein
    said driver amplifier stage includes an output circuit with first and second series resistances coupled between a signal output of said amplifier stage and an operating potential, said first resistance being connected nearer to said signal output and said second resistance being connected nearer to said operating potential;
    said generating means comprises means for exciting said intensity control assembly during image blanking intervals to induce an output signal from said intensity control assembly corresponding to said black current representative signal; and
    a signal input of said DC restoration means is coupled to a junction between said first and second resistances for sensing the magnitude of said induced output signal.

6. Apparatus according to claim 5, wherein
    the value of said first resistance is significantly greater than the value of said second resistance.

7. In a video signal processing system including an image display device for displaying video information in response to a video signal applied to an intensity control assembly thereof including an intensity control electrode, apparatus comprising:
    a driver amplifier stage with a video signal input and a video signal output circuit;
    means for AC coupling video signals from said output circuit of said driver amplifier;
    a current path for coupling video signals from said AC coupling means to said intensity control assembly; and
    bias control means coupled to said display device for automatically maintaining a desired bias condition for said display device, wherein said bias control means comprises
    means for applying a forward biasing excitation signal to said intensity control assembly during image blanking intervals to induce an output signal from said intensity control assembly representative of the magnitude of black current conducted by said display device;
    means coupled to said output circuit of said driver amplifier for sensing said induced output signal at said output circuit;
    means responsive to said sensed induced output signal for developing a biasing signal with a magnitude related to the magnitude of said induced output signal; and
    means for coupling said biasing signal to said intensity control assembly to maintain said desired bias condition.

8. Apparatus according to claim 7, wherein
    said image display device is a kinescope;
    said intensity control assembly includes a cathode electrode and an associated grid electrode;
    said AC coupling means includes a capacitance coupled between said output circuit of said driver amplifier and said cathode electrode;
    said excitation signal is applied to said grid electrode for inducing a cathode output signal corresponding to said black current representative signal; and
    a DC restoration circuit responds to said induced cathode output signal for providing said biasing signal with a magnitude related to the magnitude of said induced cathode output signal.

9. In a video processing system including an image display device for displaying video information in response to video signals applied to an intensity control assembly thereof, apparatus comprising:

a driver amplifier stage;

means comprising an AC coupled current path for conveying video signals from an output circuit of said driver amplifier to said intensity control assembly of said display device; and bias control means coupled to said display device for automatically maintaining a desired bias condition therefor, said bias control means including means for exciting said intensity control assembly during image blanking intervals to produce an output signal with a magnitude representative of the magnitude of black current conducted by said display device during image blanking intervals;

means for sensing said representative output signal at a point in said AC coupled current path;

means for developing a bias control signal related to the magnitude of said representative signal; and means for applying said bias control signal to said intensity control assembly.

10. Apparatus according to claim 9, wherein said AC coupled current path comprises a coupling capacitor with an input coupled to said output of said driver stage, and an output coupled to said intensity control assembly;

said representative signal is sensed at a point prior to said capacitor input; and said bias control signal is applied to a point after said capacitor output.

* * * * *